United States Patent
Dupart et al.

(10) Patent No.: US 6,355,294 B1
(45) Date of Patent: Mar. 12, 2002

(54) SAVORY CEREAL

(75) Inventors: Pierre Dupart, Zuerich/Witlkon; Leonhard Blasius, Tengen; Kurt Bloechlinger, Kemptthal, all of (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/575,713

(22) Filed: Jul. 27, 2000

(30) Foreign Application Priority Data

Sep. 11, 1999 (EP) .............................. 99118148

(51) Int. Cl.$^7$ ................................. A23L 1/00
(52) U.S. Cl. .................. 426/618; 426/614; 426/622
(58) Field of Search ................. 426/618, 622, 426/650, 614

(56) References Cited

U.S. PATENT DOCUMENTS

| | | | |
|---|---|---|---|
| 3,653,916 A | 4/1972 | Straughn et al. ............... 98/81 |
| 4,394,397 A | 7/1983 | Lometillo et al. .......... 426/557 |
| 4,568,550 A | 2/1986 | Fulger et al. ................. 426/19 |
| 4,650,685 A | 3/1987 | Persson et al. .............. 426/285 |
| 4,891,238 A | 1/1990 | Kurokawa et al. .......... 426/559 |
| 4,978,552 A | 12/1990 | Kurokawa et al. .......... 426/559 |
| 5,035,906 A | 7/1991 | Persson et al. .............. 426/285 |
| 5,093,146 A * | 3/1992 | Calandro et al. ............ 426/622 |
| 5,391,388 A * | 2/1995 | Lewis et al. ................. 426/618 |
| 5,700,512 A | 12/1997 | Desjardins et al. ......... 426/557 |

FOREIGN PATENT DOCUMENTS

| | | |
|---|---|---|
| DE | 44 38 559 | 5/1996 |
| EP | 0 113 056 | 7/1984 |
| EP | 0 662 788 | 7/1995 |
| FR | 2 067 991 | 8/1971 |
| GB | 2 136 666 | 9/1984 |
| GB | 2 176 089 | 12/1986 |
| WO | WO 84/03421 | 9/1984 |
| WO | WO 95/04475 | 2/1995 |

* cited by examiner

Primary Examiner—George C. Yeung
(74) Attorney, Agent, or Firm—Winston & Strawn

(57) ABSTRACT

The present invention relates to a cooked, extruded, and expanded savory cereal having a porous texture, specific weight of from 100 to 500 grams/liter, gelatinization degree of more than 25%, and residual water content of from 1 to 5%. The present invention also relates to a process for manufacturing a savory cereal using a multi-zoned extruder heated at various barrel heating temperatures to effect the cooking, extrusion, and expansion of the cereal product. The savory cereal may be used alone or as a component of a food preparation, mixture, or product such as an omelet or scrambled eggs.

13 Claims, No Drawings

SAVORY CEREAL

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

FIELD OF THE INVENTION

The present invention relates to a cooked, extruded, and expanded food product that may be consumed as such or added as a component of another food preparation or mixture. More specifically, the present invention relates to a cooked, extruded, and expanded savory cereal and to a process for manufacturing such cereal.

BACKGROUND OF THE INVENTION

A number of food products such as bread, pudding, confectionery, and various other types of snack foods and flour-based products have been manufactured using the process of extrusion cooking. These products, typically possessing very specific properties, are designed, formulated, and processed to satisfy a particular perceived need.

EP 06 62 788 discloses a process for preparing croutons that float on the surface of a hot soup, which comprises cooking, extruding, and expanding a mixture of amylaceous powdery material, fat, and filler so as to obtain at the outlet of the extruder a food mass having a moisture content of 10–16% by weight and a total fat content of 6–14% by weight of the dry mixture.

GB 2 176 089 discloses a food product that can withstand prolonged exposure to hot or cold liquids through a coating provided by a fatty substance, and a process for making it utilizing one or more metal plates each having one or more apertures which prevent the fragmentation of the food product into powder or granules.

U.S. Pat. No. 3,653,916 discloses a method for preparing an onion ring type snack using a collet extruder for mixing and extruding a formulated mixture comprising 90 to 95 parts flour, 4.75 to 5.75 parts onion flavoring, and up to 5 parts sugar.

U.S. Pat. No. 4,568,550 discloses a process of preparing a cooked and extruded flour-based product wherein the dough is subjected within the extruder to a cooking temperature between 60° C. to 120° C. and wherein a required gas-forming agent is incorporated into the dough to provide an aerated cell structure.

While these products provide certain benefits, none provide an improved cereal product that can be used alone or as a component of a food preparation, mixture, or product while retaining its crispness and rehydrating properly. Thus, there remains a need for such improved cereal products. The present invention provides such type of product and process for preparing it.

SUMMARY OF THE INVENTION

The present invention resolves the problems of the prior art by providing a cooked, extruded, and expanded savory cereal comprising mainly an amylaceous powdery material, fat, and spices. The cereal may be used alone or as a component of a food preparation, mixture, or product such as an omelet or scrambled eggs. When used as part of a food product that comprises eggs, the savory cereal may be present in an amount of between about 5% to about 50% by weight. Another object of the present invention is to provide a process for manufacturing such savory cereal.

The savory cereal of the present invention preferably comprises a mixture of starchy powdery material and/or vegetable powder, oil or fat, and non-fat milk solids. Upon cooking, extruding, and expanding, the resulting savory cereal possesses a specific weight of from about 100 grams/liter to about 500 grams/liter, preferably from about 150 grams/liter to about 350 grams/liter, a gelatinization degree of more than about 25%, preferably of from about 50% to about 90%, and a residual water content of from about 1% to about 5%. Conventional flavoring ingredients such as sugar, salt, and/or spices can also be included if desired.

The savory cereal is prepared by cooking, extruding, and expanding the mixture using a multi-zoned extruder which is heated at various temperatures to effect the cooking and expansion. The resultant savory cereal has the desired specific weight, gelatinization degree, and expansion degree. In the first zone of the extruder, the ingredients of the savory cereal composition are mixed and then transported into the next zone. The mixture is heated, kneaded, and then expanded in the succeeding zones having varying lengths, barrel heating temperatures, and pressures. After the expansion phase, the resulting extruded rope of cooked, extruded, and expanded mass is cut and dried in hot air.

The present invention offers an advantage in that the resultant savory cereal does not lose its crispness and also rehydrates properly within a given period after mixing with a food preparation, mixture, or product, including those containing eggs, such as omelets or scrambled eggs.

BRIEF DESCRIPTION OF THE SEVERAL VIEWS OF THE DRAWINGS

Not Applicable

DETAILED DESCRIPTION OF THE INVENTION

The cooked, extruded, and expanded savory cereal of the present invention preferably comprises, by weight, of from about 40% to about 80% of corn and/or wheat semolina or flour, from about 3% to about 8% of oat flour, from about 5% to about 40% of other amylaceous powdery material and/or vegetable powder, from about 2% to about 9% of oil or fat, and from about 1% to about 5% of non fat milk solids. If desired, from about 2% to about 8% of sugar, and up to about 2% of salt and/or up to 5% of spices can be included.

The process of manufacturing the savory cereal of the present invention comprises cooking, extruding, and expanding a cereal mixture to a gelatinization degree that preferably ranges from about 50% to about 90%. This process is performed at temperatures ranging from about 50° C. to about 160° C., preferably from about 80° C. to about 140° C., and under pressures ranging from about 50 bar to about 160 bar for a period of about 5 seconds to about 50 seconds. The cereal mixture described above is utilized. To make a mixture of the ingredients, from about 9% to about 25% of water may be added. A rope of cooked, extruded, and expanded mass having a water content of from 7% to 15% is obtained after extrusion, and it is subsequently cut into pieces and then dried to form the final product.

Surprisingly, the savory cereal of the present invention rehydrates properly without losing its crispness when mixed with watery foods such as eggs and then cooked in a pan to prepare a food preparation, mixture, or product. As noted above, a particularly preferred use of the savory cereal is in preparation of omelets or scrambled eggs.

The other amylaceous powdery material and/or vegetable powder may be flour or semolina. Alternatively, one may use the native starch of a cereal or mixture of cereals such as barley, rice and rye as well as garlic, onion, or leek powder. The oil or fat serves as a lubricant in the cooking-extrusion process. This ingredient may be vegetable oil, vegetable fat, or butter oil. The non-fat milk solids are preferably powdered skimmed milk. When used, the sugar may be sucrose and/or dextrose.

The cereal mixture is prepared by first mixing together the powdery components to obtain a dry mix and then mixing with the liquid components in the first mixing section of an extruder. The mixture at this point preferably comprises from about 9% to about 25% water. This water content gives rise to an expansion degree of the savory cereal of from about 2 to about 4 after cooking and extruding the mixture. This relatively low expansion degree is adequate for obtaining the desired specific weight of from about 100 grams/liter to about 500 grams/liter, and preferably from about 150 grams/liter to about 350 grams/liter.

Cooking of the mixture may be carried out in subsequent sections of the extruder where the mixture is heated, compressed, and sheared so that it forms a cooked thermoplastic mass. The thermoplastic mass may be extruded by having it pushed by an extruder screw or twin screw through the openings of a die at the end of the extruder. The thermoplastic mass may be expanded by extruding it through the die into an open space at ambient temperature and atmospheric pressure. Any traditional food extruder may be used, although a twin screw extruder is preferred. Preferably, a screw length of from about 800 mm to about 1500 mm or more is chosen to provide adequate residence time which may range from about 5 seconds to about 50 seconds.

Preferably, from four to possibly six barrel heating zones are provided in the extruder. In the first zone, the components of the mixture may be simply mixed together and transported into the next zone. In the following zones, the screw configuration can be such that the mixture is simultaneously transported and heated. The barrel heating is typically set to be within a temperature range of from about 50° C. up to about 160° C. in the second zone and from about 80° C. to about 140° C. in the third zone. One or more additional heating zones can be included, if desired for a particular product.

Optionally, additional intermediate zones, such as a fourth zone up to possibly a seventh zone, may be configured to cool and knead the heated mixture. In these zones, the screw may have a relatively short screw pitch, and the barrel heating may be set to within a temperature range of from about 60° C. to about 80° C.

The last zone of the extruder may be configured such that the previously heated and kneaded mixture is further kneaded, compressed, and then pushed through the openings of a die at the end of the screw or twin screw. In the last zone, the screw may have a relatively short screw pitch and the barrel heating may be set to within a temperature range of from about 60° C. to about 80° C.

A short, middle segment of the screw may comprise compressing elements, if desired.

The die typically has one or more circular openings of from 2 to 5 mm in diameter. The die openings may assume various shapes such as those of polygons or other items, e.g., a star or a comb.

The savory cereal of the present invention preferably has an eye-catching shape such as that of a cube, star, or shell. The present savory cereal may be partially or completely coated with a water-repelling coating which generally comprises an oil.

The present savory cereal may be used alone or form part of a food preparation, mixture, or product. In addition, the mixture may comprise a flavor mix that imparts a flavor such as cheese, mushroom, tomato, corn, or their combinations, to the mixture. The mixture may also comprise one or more vegetable garnishing components such as freeze-dried leek, mushroom, or corn.

The present savory cereal may be conditioned, alone or as part of a mixture or preparation, in a package that protects against humidity. The packaging material may be made of aluminum foil, plastic, or other suitable food packing materials.

Section s1

EXAMPLES

The following are provided as examples of the various embodiments of the savory cereal and the process for its manufacture according to the present invention. Unless otherwise stated, the parts and percentages are by weight. These examples are not to be construed as limiting the present invention in any manner.

Section s2

Example 1

To prepare a savory cereal having a shell shape, which may be used alone or as part of a food preparation, mixture, or product such as omelet or scrambled eggs, a mixture with the following composition, in % by weight of the mixture excluding a water, was prepared:

TABLE 1

| corn semolina | 75.0 |
| --- | --- |
| wheat flour | 3.1 |
| oat flour | 3.1 |
| skimmed milk powder | 2.0 |
| yeast extract | 1.0 |
| salt | 0.5 |
| whet gluten | 2.5 |
| saccharose | 5.9 |
| sodium glutamate | 0.5 |
| oil | 6.4 |

*water may also be added up to 12% by weight of the mixture

The powders were first mixed together to obtain a dry mix. The dry mix, oil and added water were then mixed together in the first zone of a BC-45 type CLEXTRAL twin screw extruder. This particular extruder had a screw diameter of 55.5 mm, a total processing length of 1200 mm, six barrel heating zones, and a die made of a thick metal plate in which two comb-shaped holes were bored. The two comb-shaped holes had openings 6.3 mm long and 1.25 mm wide having rounded indentations (6 per comb) 0.8 mm thick and 0.4 mm high.

All the screw elements were double flight. The screw speed was set to 230 rpm.

In the 200-mm long first zone having a 50-mm screw pitch, the components of the mixture were simply mixed together at room temperature. The mixture was then transported to the next zone, also 200 mm in length and having a screw pitch of 50 mm. With the barrel heating set to 60° C., the mixture was simultaneously heated up and transported into the third zone. In the third zone, which was 150 mm long and which had a screw pitch of 25 mm, the barrel heating was set to 110° C. wherein the mixture was simultaneously further heated up, transported, and kneaded.

In the 200-mm long fourth zone, which had a screw pitch of 50 mm and a barrel heating temperature of 110° C., the mixture was simultaneously further heated up while being transported into the next zone. In the fifth and sixth zones, which were 100 and 300 mm in length, respectively, and in which the screw pitch were 32 mm, the plastified mass or mixture was cooled down while being simultaneously transported and kneaded under a pressure of 136 bar. The barrel heatings were set to a temperature of 75° C. in both zones.

The screw configuration comprised compressing elements along a 50-mm segment between the third and fourth zones.

At the end of the sixth zone, the hot plastic mass was compressed to 160 bar and pushed through the die wherein the temperature was set to as high as 100° C. The mass was extruded into free, open space at atmospheric pressure and ambient temperature where it expanded by a factor of about 3.

The rope of cooked, extruded, and expanded mass had a moisture content of 9.1%. It was cut into 8-mm cubes and dried in hot air down to a residual moisture content of 2.8%. Their degree of gelatinization was 88%.

The shell-shaped savory cereal so obtained had a specific weight of 180 grams/liter and a very fine, porous, crispy texture. It reconstituted quickly and kept its crispy texture after mixing for 30 seconds with fresh eggs (using 30 grams of cereal per two eggs) and cooking/frying in a pan for 2.5 minutes.

Section s3

Example 2

To manufacture a cube-shaped savory cereal, which is to be used alone or as a component of an egg-based preparation, mixture, or product such as an omelet or scrambled eggs, a mixture was prepared which had the following composition in % by weight of the mixture without the added water:

TABLE 2

| | |
|---|---|
| corn semolina | 63.8 |
| oat flour | 6.3 |
| skimmed milk powder | 2.9 |
| yeast extract | 1.0 |
| salt | 0.6 |
| saccharose | 4.0 |
| sodium glutamate | 0.5 |
| roasted onion powder | 5.0 |
| onion powder | 9.8 |
| wheat bran | 3.9 |
| oil | 2.2 |

*water may also be added up to 14.6% by weight of the mixture

The powders were combined to obtain a dry mix. The dry mix, oil and water were then mixed in the first zone of a BC-45 type CLEXTRAL twin screw extruder. This extruder had a screw diameter of 55.5 mm, a total processing length of 1200 mm, six barrel heating zones, and a die made of a thick metal plate into which one square hole somewhat shaped like a star was bored. The hole had an opening of 4 mm in side length, and each side was slightly curved inwardly. The screw elements were double flight and the screw speed was set to 300 rpm.

In the 200-mm long first zone having a 50-mm screw pitch, the components of the mixture were mixed at room temperature and then transported to the next zone.

In the 200-mm long second zone, which had a screw pitch of 50 mm and a barrel heating temperature of 50° C., the mixture was simultaneously heated up and transported into the third zone.

In the 150-mm long third zone, which had a screw pitch of 25 mm and a barrel heating temperature of 110° C., the mixture was simultaneously further heated up, transported, and kneaded.

In the 200-mm long fourth zone, which had a screw pitch of 50 mm and a barrel heating temperature of 110° C., the mixture was simultaneously further heated up and transported into the next zone.

In the fifth and sixth zones, which were 100 and 300 mm in length, respectively, and each having a screw pitch of 32 mm, the plastified mass was cooled down while being simultaneously transported and kneaded under a pressure of 96 bar with the barrel heating temperatures set to 70° C. and 60° C., respectively.

The screw configuration comprised compressing elements along a 50-mm segment between the third and fourth zones.

At the end of the sixth zone, the hot plastic mass was compressed at 108 bar and pushed through the die where the temperature was as high as 104° C. The mass was extruded into free, open space at atmospheric pressure and ambient temperature where it expanded to a degree of about 2.

The rope of cooked, extruded, and expanded mass had a moisture content of 8%. It was cut into 8-mm cubes and dried in hot air down to a residual moisture content of 2%. The degree of gelatinization of the dried, cut pieces was 51%.

The cube-shaped savory cereal thus obtained had a specific weight of 292 grams/liter and a very fine, porous, crispy texture. It reconstituted quickly and retained its crispy texture even after having been mixed for 30 seconds with fresh eggs (using 20 grams of cereal per two eggs) and after having been cooked/fried in a pan for about 2.5 minutes.

Section s4

Example 3

An omelet premix was made with the following ingredients per portion:

30 grams of shell-shaped cereal as obtained in Example 1
15 grams of a cheese and mushroom flavor mix
1 gram freeze-dried leek.
1 gram freeze-dried mushroom.

A portion was prepared by pouring the premix into a bowl into which two fresh eggs were added. The preparation was manually mixed with a fork for about 30 seconds. A pan was heated up with some oil (5 to 10 grams per portion) into which the preparation was poured and cooked/fried for 2 to 3 minutes. The shell-shaped cereal reconstituted quickly and kept its crispy texture within the mushroom-aromatized omelet.

Section s5

Example 4

An omelet premix was prepared comprising the following ingredients per portion:

20 grams of cube-shaped cereal as obtained in Example 2
10 grams of a tomato-and-corn flavor mix
3 grams freeze-dried corn.

A portion was prepared by pouring the premix into a bowl into which two fresh eggs were added. The preparation was manually mixed with a fork for about 30 seconds. A pan was heated up with some oil (5 to 10 grams per portion) into which the preparation was poured and cooked/fried for 2 to 3 minutes.

The cube-shaped cereal reconstituted quickly and kept its crispy texture within the tomato-aromatized omelet.

DEPOSIT OF COMPUTER PROGRAM LISTINGS

Not applicable

What is claimed is:

1. A savory cereal having a porous texture, a specific weight of from about 100 grams/liter to about 500 grams/liter, a gelatinization degree of more than about 25%, and a residual water content of from about 1% to about 5%, and comprising, in % by weight of the savory cereal, from about 40% to about 80% of corn or wheat semolina or flour, from about 3% to about 8% of oat flour, from about 5% to about 40% of other amylaceous powdery material or vegetable powder, from about 2% to about 9% of oil or fat, and from about 1% to about 5% of non-fat milk solids.

2. The savory cereal of claim 1, which further comprises from about 2% to about 8% of sugar and up to about 2% of salt or up to about 5% of spices.

3. The savory cereal of claim 1, wherein the oil or fat is vegetable oil, vegetable fat, or butter oil.

4. The savory cereal of claim 1, wherein the non-fat milk solids comprise powdered skimmed milk.

5. The savory cereal of claim 2, wherein the sugar is sucrose, dextrose, or a mixture thereof.

6. The savory cereal of claim 1, which further comprises an oil coating on the cereal.

7. A savory cereal having a porous texture, a specific weight of from about 100 grams/liter to about 500 grams/liter, a gelatinization degree of more than about 25%, and a residual water content of from about 1% to about 5%, and consisting essentially of, in % by weight of the savory cereal, from about 40% to about 80% of corn or wheat semolina or flour, from about 3% to about 8% of oat flour, from about 5% to about 40% of other amylaceous powdery material or vegetable powder, from about 2% to about 9% of oil or fat, and from about 1% to about 5% of non-fat milk solids from about 2% to about 8% of sugar, and up to about 2% of salt or up to about 5% of spices.

8. The savory cereal of claim 7, which further comprises an oil coating on the cereal.

9. A food product that comprises eggs and includes the savory cereal of claim 1 therein.

10. The food product of claim 9, wherein the savory cereal is present in an amount of between about 5% to about 50% by weight.

11. A food product that comprises eggs and includes the savory cereal of claim 7, therein.

12. The food product of claim 11, wherein the savory cereal is present in an amount of between about 5% to about 50% by weight.

13. A savory cereal having a porous texture, a specific weight of from about 100 grams/liter to about 500 grams/liter, a gelatinization degree of from 50% to 90% and a residual water content of from about 1% to about 5%, and comprising, in % by weight of the savory cereal, from about 40% to about 80% of corn or wheat semolina or flour, from about 3% to about 8% of oat flour, from about 5% to about 40% of other amylaceous powdery material or vegetable powder, from about 2% to about 9% of oil or fat, and from about 1% to about 5% of non-fat milk solids.

* * * * *